Jan. 11, 1966  F. H. WALTHER ETAL  3,228,778
GLASS FURNACE LINING
Filed April 8, 1964
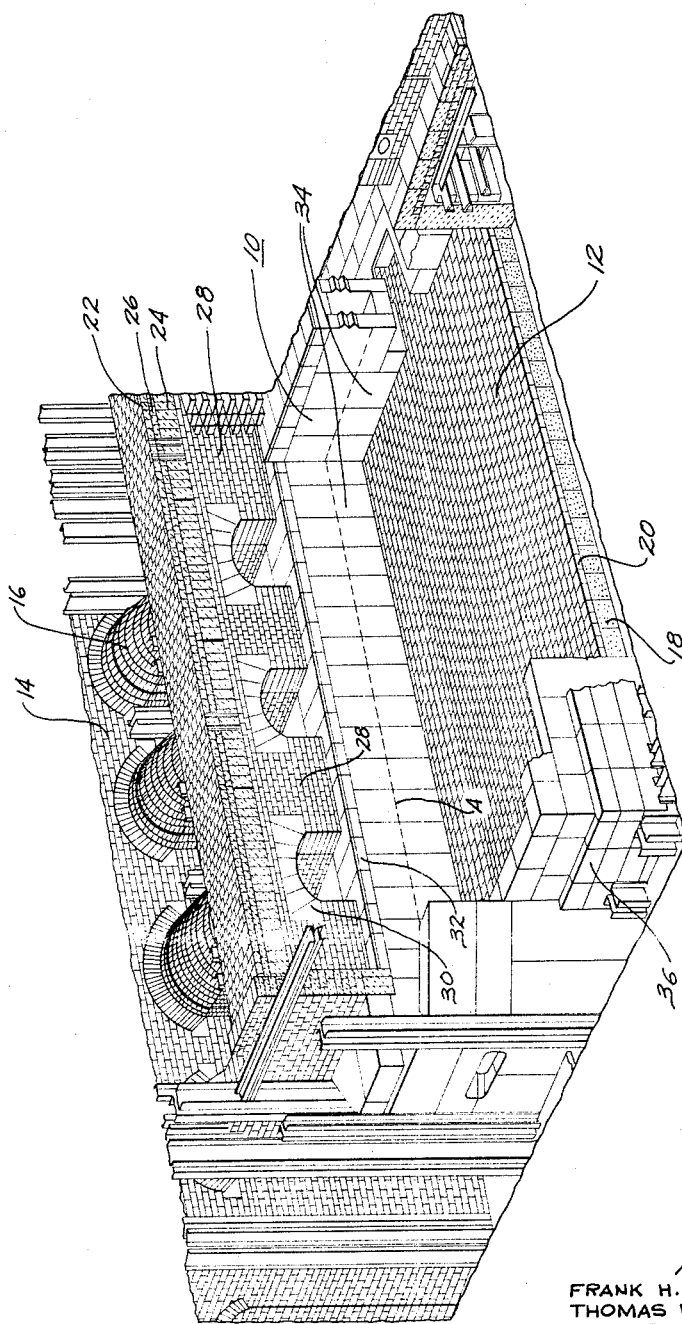
INVENTORS
FRANK H. WALTHER,
THOMAS W. SMOOT &
BY JOSEPH R. RYAN
ATTORNEY

3,228,778
GLASS FURNACE LINING
Frank H. Walther, Bethel Park, Joseph R. Ryan, Irwin, and Thomas W. Smoot, Bethel Park, Pa., assignors to Harbison-Walker Refractories Company, Pittsburgh, Pa., a corporation of Pennsylvania
Filed Apr. 8, 1964, Ser. No. 358,197
9 Claims. (Cl. 106—57)

The present invention relates to refractory compositions and refractory bodies which are composed of zirconia, principally, and which are suitable for use in contact with molten glass.

Heretofore, many commercial refractories have been proposed for use in industries where contact with molten glass is imminent. Notable among these is chromium oxide refractory which has been found to be resistive to the corrosive activity of molten glass in the fiberglass industry. However, a shortcoming of the chromium oxide is that it transfers an artificial coloring to the finished fiberglass product. In other glass industries, zircon has been employed in combination with certain metallic oxides for direct contact with molten glass. However, since free silica is always present in zircon at elevated temperatures (above 3150° F.), which free silica is soluble in molten glass, prior refractory zircon bodies have not been as corrosion resistant as is desirable.

An object of the present invention is to provide a zirconia refractory body, at least partially stabilized, of maximum density and zero outer surface porosity having almost complete resistance to the corrosive activity of molten glass.

Another object of the invention is to provide methods for producing such refractory bodies.

In order to more fully understand the nature of the invention, reference should be had to the following detailed description and drawing, the single figure of which is a fragmentary perspective view of a typical side port glass tank furnace.

Stabilized zirconia is zirconia substantially entirely exhibiting a cubic crystalline structure, the individual crystals of which are "propped" as it were, to prevent their crystallographic alteration and resulting disintegration at inversion temperatures. For example, calcium oxide, yttrium oxide, magnesium oxide, lanthanam oxide and cerium oxide are used to produce a stabilized zirconia refractory. For greater detail concerning the stabilization of zirconia, see U.S. Patent No. 3,091,014, assigned to the assignee of the present invention.

It has been discovered, in accordance with this invention, that by fusion casting a batch of stabilized zirconia refractory grains at a temperature in excess of 4000° F., i.e. about 4600° F., a body of maximum density having zero outer surface porosity may be produced which is resistant to the corrosive action of molten glass.

Refractory shapes consisting entirely of stabilized zirconia are highly desirable in the glass industries since zirconia, being a relatively pure material, does not introduce impurities into the molten glass with which it comes into contact. However, many of the furnaces now in use have not been able to attain the high temperatures necessary to fusion cast zirconia. Therefore, it has been considered desirable to combine the stabilized zirconia with glass forming materials in relatively small amounts (i.e. up to 5% zircon, up to 1.5% titania and up to 0.1% boric acid) to bind the zirconia grains, and enable refractory shapes to be produced by slip casting or by fusion casting at lower temperatures i.e. 4000° F. and lower.

Briefly, in accordance with one embodiment of the invention, there is provided a refractory shape formed from a batch consisting essentially of, by weight, from 1 to 5% of zircon, from 0.5 to 1.5% of titania, up to 0.1% of boric acid and the balance stabilized zirconia. The zircon, titania, and boric acid, if desired, provide a glass matrix to bind the zirconia grains and substantially eliminate the surface porosity of the final shape. The above components also aid in shrinking the shape to maximum density.

The refractory compositions of the invention have been found to be particularly resistant to the corrosive activities of molten borosilicate glass, especially the fiberglass variety, and high lime glasses.

In practice, a dense refractory shape characterized by having a substantially zero outer surface porosity which is resistant to corrosion by molten glass may be produced by one of several methods which is, in part, determinative of the composition of the batch.

A refractory shape consisting of, by weight, from 1 to 5% of zircon, from 0.5 to 1% of titania, and from 0.05 to 0.1% of boric acid and the balance stabilized zirconia is produced by blending the above materials in a standard mixer with a deflocculating agent, such as, sodium alkyl sulfurate. A slip is formed from the mixture and is molded to provide a body of a desired shape. The shape is subsequently fired at a temperature in excess of 3000° F. (about 3140° F.) for a period of several hours. In forming a slip casting in the above described manner, all of the components should have a particle size of at least about —200 mesh and preferably —325 mesh.

Alternatively, a dense, nonporous refractory body possessing increased resistance to corrosion by molten glass is produced by fusion casting. The refractory batch consists of from 1 to 5% of zircon, from 0.5 to 1% of titania and the balance stabilized zirconia. The batch is heated to an elevated temperature, i.e. 4000° F., to fuse the particles and provide a free flowing molten mass. The fused mixture is then molded to form a body of desired shape and the shaped body is annealed before cooling to relieve any stresses therein.

The fusion of the compositions described herein may be made using an electric arc furnace with a water-cooled shell, the batch to be fused acting as a lining for the inside of the furnace shell. The fused refractory may be poured into a sand or graphite mold and annealed in insulation according to common practice for the manufacture of present fused or hot cast refractories.

Referring to the figure, there is shown a portion 10 of a glass tank furnace. The furnace generally consists of a melting chamber 12 and one or more checker chambers 14. The melting chamber and checker chamber are connected by a plurality of ports 16 which serve as conduits to generate and regulate the heat to the melting chamber 12.

The typical melting chamber usually consists of refractory brick of different types depending upon their location in the furnace. For instance, the melting chamber floor may contain a base layer 18 of fireclay brick and an upper layer 20 of zircon brick. The furnace crown 22 may contain an inner layer 24 of low porosity silica brick and an outer layer 26 of silica insulating brick. The breast wall 28 within the chamber 12 generally consists of silica brick. The port arch 30 and sill 32 may consist of a fusion cast, high alumina brick. It should be appreciated that whatever the composition of the aforementioned brick, they are fabricated to resist the alkali laden atmosphere of a glass melting furnace.

The most cautiously chosen refractory in the entire furnace should be in the lower wall 34 of the melting chamber. This is the area with which the refractory and molten glass come into actual contact and is therefore the area subject to the corrosive activity of the glass. The refractory material employed for the wall 34 may be any one of the brick compositions set forth in accordance with this invention. In another embodiment, the compositions of the invention may be employed in only a segment of the wall 34, for example, between line A and the chamber floor. Line A represents, schematically, a position slightly above the top of a bath of molten glass. The segment above line A may then consist of a fusion cast, high alumina brick. The wall 34 may be backed by a layer 36 of silica insulating brick, if desired.

The following examples are illustrative of the teachings of the invention.

*Example I*

A batch was prepared containing 89% of zirconia stabilized with CaO, 10% of zircon, 1% of titania, and 0.5% of boric acid. The particle size of the components was essentially all −325 mesh. The batch was formed into a slip using sodium alkyl sulfurate as a dispersing agent and cast in the usual manner to form small rectangular bars which were fired at about 3000° F. The resulting shape had a density of 299 p.c.f., a specific gravity of 5.15 grams per cc. and a surface porosity of 7.1%.

*Example II*

A batch was prepared containing 92% of zirconia stabilized with CaO, 7% of zircon, 1% of titania, and 0.5% of boric acid. The batch was formed into a slip, cast and fired as in Example I. The resulting shape had a density of 312 p.c.f., a specific gravity of 5.31 grams per cc., and a porosity of 5.9%.

In Examples I and II it is believed that the high percentages of zircon contributed to the surface porosity of the shape. Also, the presence of a substantial amount of silica in the zircon would be deleterious to the corrosion resistance of the shape to molten glass.

*Example III*

A batch was prepared containing 94% zirconia stabilized with CaO, 5% of zircon, 1% of titania, and 0.1% of boric acid. The batch was formed into a shape as in Example I. The resulting shape had a density of 336 p.c.f., a specific gravity of 5.38 grams per cc. and a surface porosity of zero. The resulting shape was immersed in a molten bath of lithium tetraborate held at a temperature of 2200° F. for a period of 45 minutes. The shape was removed from the bath and examined. Examination revealed the absence of attack by the lithium tetraborate.

*Example IV*

A batch is prepared similar to Example III. The batch is fusion cast in an electric arc furnace at a temperature of 4000° F. to form a rectangular bar. The resulting bar is annealed before cooling at a temperature of about 2000° F. for about 5 hours to relieve all internal stresses therein. The resulting shape contains a nonporous outer surface and is resistive to the corrosive action of molten glass.

*Example V*

A batch is prepared containing 98.4% of zirconia stabilized with yttrium oxide, 1% of zircon, and 0.5% titania. The shape is fusion cast and annealed as in Example IV and the resulting shape is free of outer surface porosity and is resistant to the corrosion of molten glass.

It is intended that the foregoing description be interpreted as illustrative and not in limitation of the invention.

We claim:

1. A refractory shape consisting essentially of, by weight, 1 to 5% of zircon, 0.5 to 1.5% of titania, 0.05 to 0.1% of boric acid and the balance stabilized zirconia, the shape being characterized by having a substantially zero outer surface porosity.

2. A slip cast refractory shape consisting essentially of, by weight, from 1 to 5% of zircon, from 0.5 to 1.5% of titania, from 0.05 to 0.1% of boric acid and the balance stabilized zirconia, the shape being characterized by having a substantially zero outer surface porosity.

3. The refractory shape of claim 2 in which all of the components have a particle size of at least −200 mesh.

4. A fused cast refractory shape consisting essentially of, by weight, from 1 to 5% of zircon, 0.5 to 1% of titania and the balance stabilized zirconia, the shape being characterized by having a substantially zero outer surface porosity which is resistant to the corrosive activity of molten glass.

5. A slip cast refractory shape consisting essentially of, by weight, 5% zircon, 1% titania, 0.1% boric acid and the balance stabilized zirconia, the zircon and zirconia having a particle size of about −325 mesh, the shape being characterized by having a substantially zero outer surface porosity which is resistant to the corrosive activity of molten glass.

6. A fused cast refractory shape consisting essentially of, by weight, 1% zircon, 1% titania and the balance stabilized zirconia, the shape being characterized by having a nonporous outer surface which is resistant to the corrosive activity of molten glass.

7. A method for making a dense, nonporous refractory body possessing increased resistance to the corrosive activity of molten glass which comprises preparing a mixture consisting essentially of, by weight, from 1 to 5% of zircon, from 0.5 to 1.5% of titania, up to 0.1% of boric acid, and the balance stabilized zirconia, fluidizing the mixture, molding the mixture to form a body of desired shape, and subsequently applying heat to the body.

8. A method of producing a dense, nonporous refractory body possessing increased resistance to corrosive activity of molten glass which comprises preparing a mixture consisting essentially of from 1 to 5% of zircon, from 0.5 to 1.0% of titania, from 0.05 to 0.1% of boric acid and the balance stabilized zirconia, forming a slip from such mixture, molding the slip to form a body of desired shape, and firing the shaped body to a temperature of about 3140° F. for a period of several hours.

9. A method of producing a dense, nonporous refractory body possessing increased resistance to corrosive activity of molten glass which comprises preparing a mixture consisting essentially of from 1 to 5% of zircon, from 0.5 to 1.0% of titania and the balance stabilized zirconia, fusing the mixture at a temperature of about 4000° F., molding the fused mixture to form a body of desired shape, and annealing the shaped body.

References Cited by the Examiner

UNITED STATES PATENTS

| | | | |
|---|---|---|---|
| 2,352,530 | 6/1944 | Fulcher et al. | 106—57 |
| 2,535,526 | 12/1950 | Ballard et al. | 106—57 |
| 2,567,592 | 9/1951 | Ballard | 106—57 |

TOBIAS E. LEVOW, *Primary Examiner.*

J. E. POER, *Assistant Examiner.*